March 3, 1959 J. M. MARKEL 2,876,014
MANURE SPREADER WITH ADJUSTABLE END GATE
Filed Jan. 8, 1954 4 Sheets-Sheet 2

INVENTOR:
JOHN M. MARKEL
BY: *Emerson B Donnell*
ATTY.

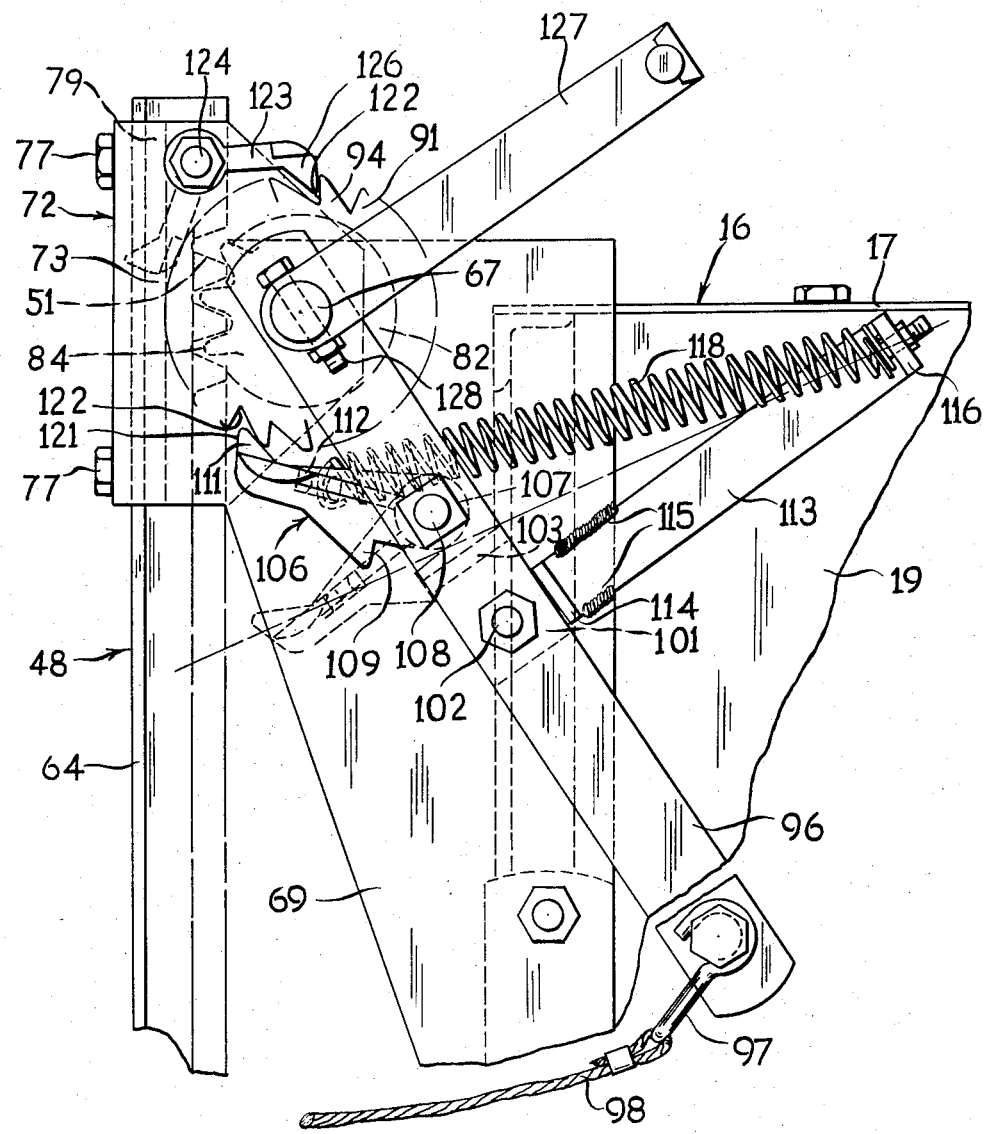

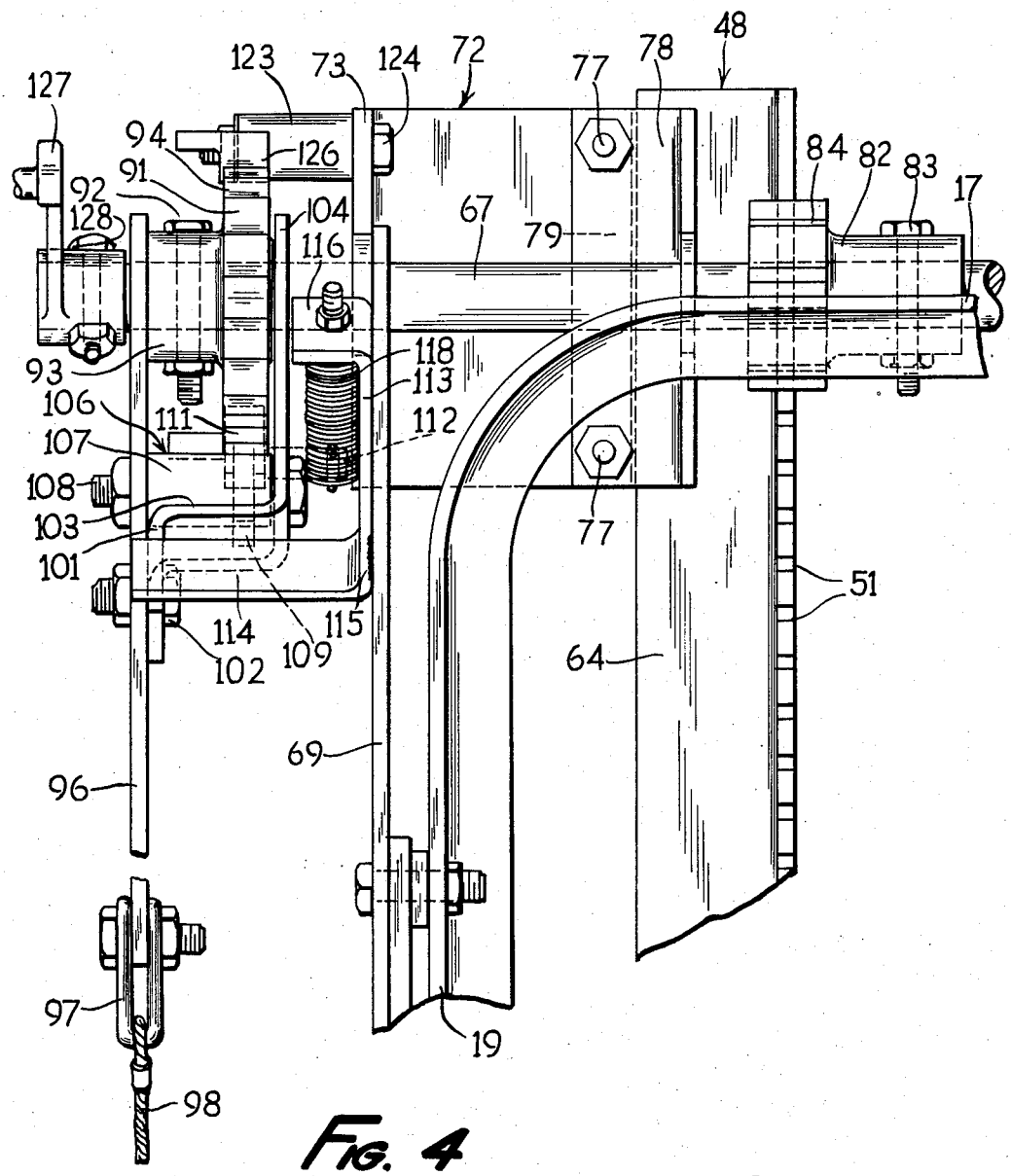

United States Patent Office 2,876,014
Patented Mar. 3, 1959

2,876,014

MANURE SPREADER WITH ADJUSTABLE END GATE

John M. Markel, Rockford, Ill., assignor to J. I. Case Company, Racine, Wis.

Application January 8, 1954, Serial No. 402,932

7 Claims. (Cl. 275—3)

This invention pertains to a fertilizer spreader, and, more particularly, it pertains to a fertilizer spreader of the type used to spread manure.

It is an object of this invention to provide a fertilizer spreader wherein the quantity of fertilizer spread can be positively and accurately controlled. The spreader operator can maintain control conveniently from his position on a towing tractor irrespective of the speed of the tractor and spreader.

Another object of this invention is to provide a manure spreader which permits the spreader box to be completely filled and taken to the area to be fertilized without the loss of fertilizer.

Still another object of this invention is to provide a manure spreader which enables the manure to be spread in a more uniform manner regardless of the quantity of manure being carried in the spreader box.

Other objects and advantages will become more readily apparent upon reading the following disclosure in light of the accompanying drawings, in which, Figure 1 is a fragmentary perspective view of a manure spreader containing a preferred embodiment of this invention.

Figure 3 is a fragmentary side elevation view of the spreader shown in Figures 1 and 2 viewed from the side shown in Figure 2 but having the operating parts in the position shown in Figure 1.

Figure 4 is a fragmentary rear elevation view of the spreader shown in Figure 3.

Similar reference numerals refer to similar parts throughout the several views.

Figure 1:
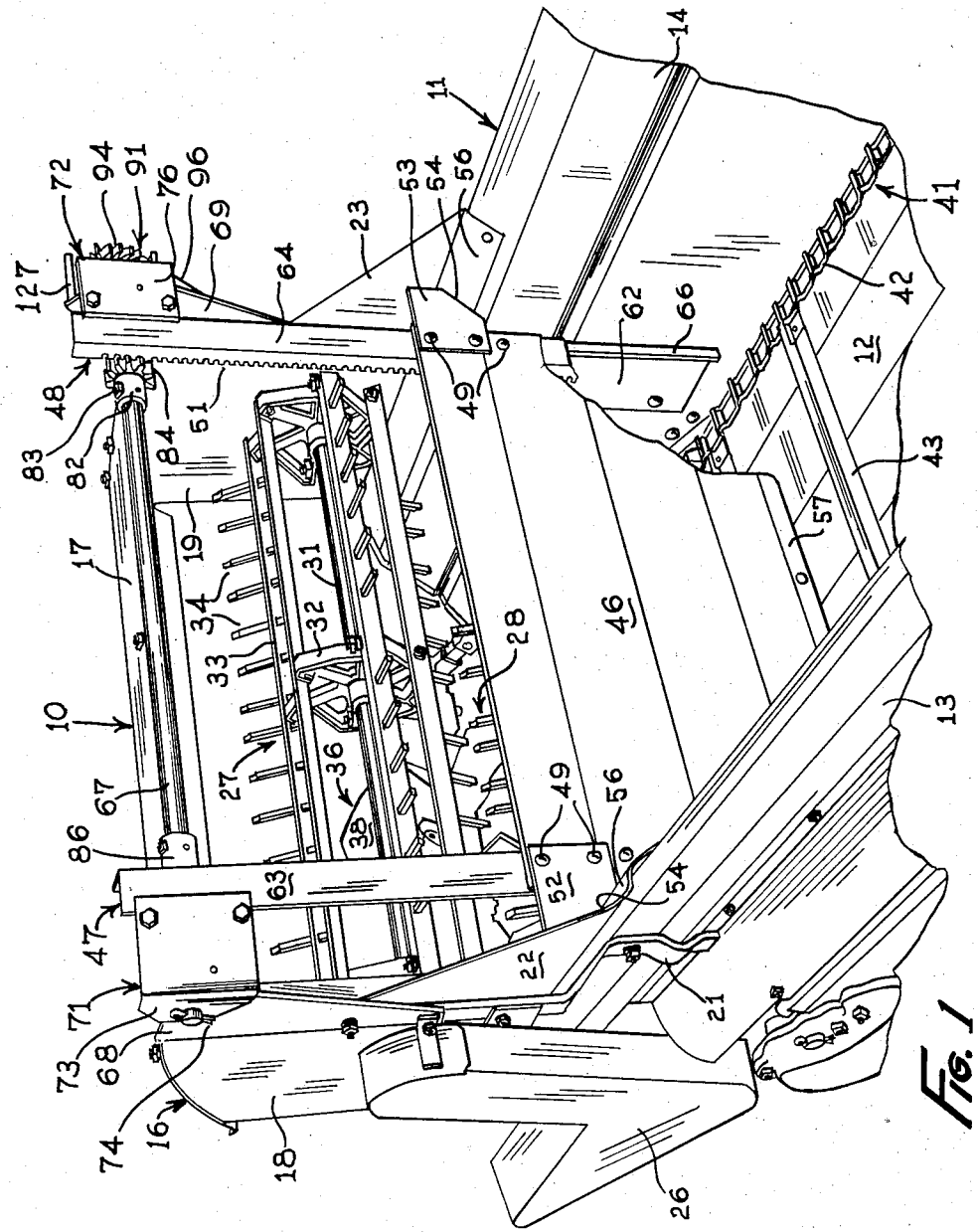

Figure 1 shows a rear end part of a generally conventional manure spreader 10 which is normally pulled by a tractor (not shown). In the embodiment shown, the spreader 10 consists of a conventional box 11 which is formed and positioned to carry manure. The box 11 consists of a horizontally disposed bottom or floor 12 with a pair of spaced apart and vertically positioned sides 13 and 14 mounted on the bottom 12. Further to the rear of the spreader 10 is a beater shield or hood 16 with a top deflector plate 17 and a pair of spaced sides 18 and 19. The shield 16 is attached to the box 11 by an arched support bracket 21 which is bolted to the box side 13 and also to the beater shield side 18. To further the attachment, an angle plate 22 is bolted between the top of box side 13 and shield side 18 with a similar plate 23 mounted in the corner between box side 14 and shield side 19. It should also be understood that a bracket 24 is attached on the side opposite to that of plate 23, see Figure 2.

As further shown in Figure 1, a beater chain shield 26 is attached to the side of the spreader 10 to enclose the drive chains which are not shown. Rotatably mounted within the shield 16 is a pair of beaters 27 and 28 which are horizontally disposed with their bearings located in the shield sides 18 and 19. The beater 27, mounted in an upper position, consists of a rotatable shaft 31 with several beater heads 32 non-rotatably attached thereto and spaced axially along the shaft to support several tooth bars 33 in an axially spaced relation to shaft 32. Mounted along the bars 33 are a plurality of radially disposed teeth 34.

Spaced to the extreme rear of the spreader 10, and substantially in the plane of the lower beater 28, is a widespread beater 36 consisting of a horizontally mounted rotatable shaft 37 with a plurality of paddles 38 non-rotatably mounted on shaft 37 and axially spaced therealong. See Figure 2. The widespread beater 36 is shown to be mounted on a bearing bar 39 which is suitably attached to the spreader 10.

Referring again to the box 11, it will be seen that there is provided a conveyor 41 in the bottom of the box. Conveyor 41 consists of a pair of spaced apart and endless chains 42 with intermediate angle bars 43 attached therebetween at intervals along the chains.

Generally, the foregoing description is of a conventional manure spreader and, therefore, no further discussion is deemed to be necessary for an understanding of it.

In the operation of the spreader, the manure is placed inside the box 11 and the spreader 10 is pulled along the ground. As it is pulled, the conveyor is motivated rearwardly across the box bottom 12 and angle bars 43 are moved accordingly. With this action, the manure is moved rearwardly in the box 11 to where it is engaged by the beaters 27 and 28 which pick up and scatter the manure to where it is finally engaged by the widespread beater 36 and distributed onto the ground to be fertilized.

In the foregoing operation, it should be understood that the conveyor, the beaters, and the widespread beater are preferably all powered by virtue of pulling the spreader 10 with a tractor.

Figure 2:
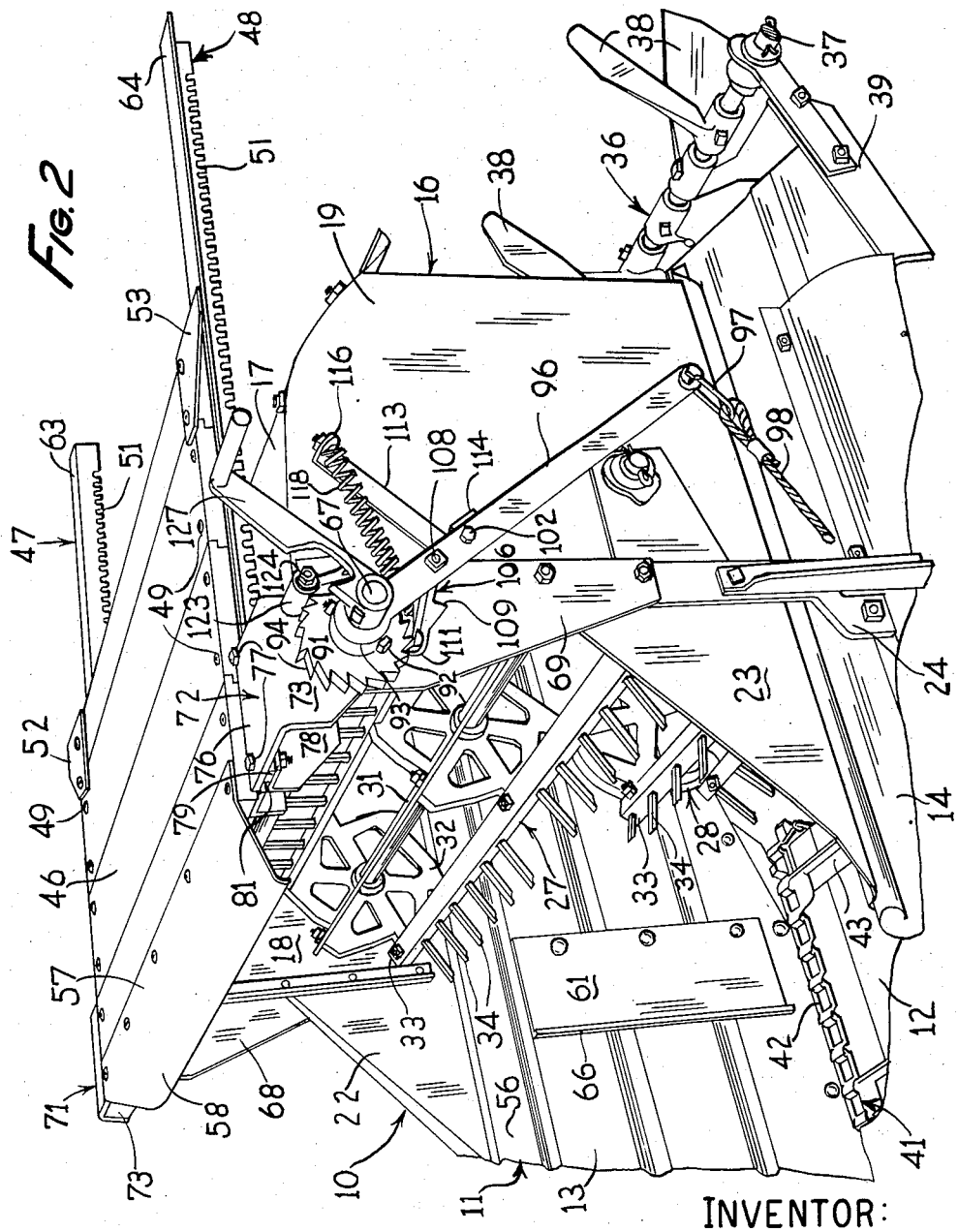
Figure 2 is a fragmentary perspective view of the spreader shown in Figure 1 but viewed from the side opposite to that of Figure 1 and with the operating parts in a different position.

The following description will elaborate upon the structure which is a preferred embodiment of this invention. Thus, as seen in Figure 1, an end gate 46 is mounted in a vertical position across the rear end of the box 11. The end gate is formed into preferably a solid member having a pair of gear racks 47 and 48 attached one to each opposite end of gate 46 and at the rear side thereof by means of bolts 49 to be in a vertical position and extend above the gate 46. A series of gear teeth 51 are provided along an edge of the racks 47 and 48 which are preferably formed from angle bars as shown. Also attached to end gate 46 are a pair of oppositely disposed extensions 52 and 53 which are bolted to the top of the gate 46 to extend laterally therefrom. The undersides of these extensions are preferably tapered as at 54 to enable them to abut a bevel 56 on the angle plates 22 and 23, thereby preventing the end gate from dropping to a level where it would interfere with the conveyor 41. The extreme bottom edge of the end gate 46 is preferably provided with an extension plate 57 which is bolted thereto and which is angled rearwardly at its lower section 58 as best seen in Figure 2. With this construction, the fertilizer moving toward the end gate will easily be deflected downwardly to pass thereunder.

To support the end gate 46 forwardly against the rearward thrust of the fertilizer, there is preferably provided a pair of plates 61 and 62 suitably rigidly secured to the sides 13 and 14, respectively, at a position immediately behind end gate 46 and forming shoulders against which gate 46 may bear under pressure of the load. With this arrangement, it will be apparent that the racks 47 and 48, at their respective angled sections 63 and 64, will abut a forward edge 66 of the guide plates 61 and 62 and thereby maintain the end gate 46 against moving rearwardly beyond the vertical position shown in Figure 1.

Mounted in a horizontal position substantially directly above end gate 46 and tranverse to the box 11, is a shaft 67 which is rotatably mounted to extend through a pair of oppositely disposed support plates 68 and 69 mounted on the beater shield sides 18 and 19, respectively by bolts or the like as shown. Pivotally mounted on the opposite ends of the shaft 67 so as to swing about the center thereof are guide brackets 71 and 72 which are preferably angle shaped with one part 73 extending along the outside of plates 68 and 69 to provide the surface for mounting onto the shaft. To maintain the shaft 67 and the bracket 71 on the plate 68, a cotter pin 74 is preferably engaged through a projecting end of shaft 67.

As best seen in Figures 2 and 4, attached to the rear or inside a front part 76 of bracket 72 by means of bolts 77, is an inner guide 78 with a spacer 79 positioned between guide bracket 72 and the guide 78. This arrangement forms a rectangularly shaped recess 81 between opposed faces of bracket part 76 and guide 78. The edge of the section 64 of the rack 48 is received within the recess 81 and guided in its longitudinal movement therein by the guide bracket 72 and guide 78. It should be understood that it is preferred to have the guide bracket 71 and rack 47 similarly related to further guide the end gate 46 in its vertical movement.

In observing Figure 1, it will be noted that a spur gear 82 is non-rotatably mounted on the shaft 67 preferably by means of a bolt 83 extending through the gear hub and the shaft. Also, the gear, containing teeth 84, is so positioned axially on shaft 67 that the gear teeth mesh with the teeth 51 of the rack 48. Again a similar construction is preferably provided on the opposite end of shaft 67 as shown with a gear 86 non-rotatably mounted onto the shaft.

From the foregoing, it should be obvious that with rotation of the shaft 67 and corresponding rotation of gears 82 and 86, the end gate 46 is adjusted in a vertical plane to position it as desired and thereby alter the size of the passageway at the rear end of the spreader box 11. It should be noted that the end gate 46 is raised and shifted to a horizontal position shown in Figure 2 from the vertical position shown in Figure 1. This is accomplished by moving the gate vertically until the end of the racks engage the gears 82 and 86 at which time, since the racks can no longer move lengthwise, further rotation of the shaft 67 causes corresponding rotation of the racks and places the gate in the horizontal position and out of operation.

The mechanism for actually imparting rotation to the shaft 67 is shown to be a ratchet and pawl construction. A ratchet wheel 91 is non-rotatably mounted onto an end of the shaft 67 by means of a bolt 92, or the like, extending through a hub 93 of the ratchet 91 and also through the shaft 67. The ratchet wheel is provided about its entire periphery with the usual ratchet teeth 94 as shown in Figure 2.

Rotatably mounted on the end of the shaft 67, adjacent the ratchet wheel 91, is a ratchet arm 96. The arm 96 extends a substantial distance from the shaft 67 and downwardly along the side of the beater shield to form a lever. The lower end of the arm 96 has a hook 97 secured thereto with a rope 98 attached to the hook to extend forwardly along the side of the box 11 to be convenient to the operator of the tractor (not shown). The arm and rope constitute an actuator for the ratchet and pawl construction.

In considering the structure of arm 96, it will be noted in Figure 4 that there is preferably provided an inner angled arm 101 which is attached to the arm 96 by a bolt 102 to extend transverse to the arm 96 in a section 103 and parallel to the arm 96 in a section 104 to where it is rotatably mounted on the shaft 67. The arms 96 and 101 therefore form a bifurcated yoke or fork which is rotatably mounted on the shaft 67.

A lift pawl 106 is pivotably mounted on the arms 96 and 101 and therebetween, having a shank 107 which is secured to the yoke by a bolt 108 which passes therethrough. The pawl 106 is further provided with a shoulder 109 and a forwardly located tooth 111. Integral with the inner side of the pawl 106 is a projection 112 as seen dotted in Figures 3 and 4.

A U-shaped bar 113, having legs 114 and 116 extending outwardly therefrom at opposite ends, is welded, as at 115, or otherwise secured to the side of the plate 69. The leg 114 projects a sufficient distance from the plate 69 to abut the arms 96 and 101 and thereby restricts the ratchet arm in its rearward movement. The opposite leg 116 serves as an anchor for a coil spring 118 which is attached thereto and which extends to the pawl projection 112 where it attaches to the pawl 106.

As seen in Figure 3, the centerline of the spring 118 is above the axis of the pawl shank 107 and, therefore, the pawl tooth 111 is yieldably urged into engagement with the ratchet teeth 94 as the pawl 106 is being pulled upwardly by the spring 118.

The operation of the ratchet mechanism consists of the operator pulling on the rope 98 to pivot the ratchet arm 96 clockwise. This action moves the lift pawl 106 into driving engagement with the ratchet wheel 91, and further pull on the rope will rotate the ratchet wheel clockwise, and correspondingly rotate the shaft 67, to raise the end gate. At the beginning of this operation, it should be obvious that the pawl 106 is pivoted slightly under the influence of the spring 118, from the position shown in Figure 3 to where a forward surface 121 of the pawl tooth 111 abuts a surface 122 of the tooth 94 of the ratchet wheel.

To maintain the end gate in its then adjusted or raised position, there is preferably provided a stop pawl 123 which is pivotally mounted on the guide bracket 72 at the upper end thereof by means of a bolt 124 to be operable on the top of the ratchet wheel 91. Since the weight of the end gate, when in the vertical position, will tend to lower it and the racks 47 and 48, the engagement of the racks with the gears 82 and 86 tends to rotate the shaft 67 counterclockwise as seen in Figures 2 and 3. At that time the stop pawl 123 will engage the ratchet tooth 94 and prevent the shaft from reversing rotation and thereby hold the end gate in any desired vertical position. To this end, a tooth 126 on the pawl 123 abuts the surface 122 of the ratchet tooth 94. The pawl 123 pivots freely in its mounting to rise and fall as the ratchet is rotated clockwise and the pawl rides the crests of the teeth 94. Also, when the arm 96 is pivoted to rotate the ratchet 91 to where the pawl 123 maintains the ratchet, release of the tension on the rope 98 permits the spring 118 to retract the ratchet arm 96 and correspondingly the pawl 106 to substantially the position shown in Figure 3.

To lower the end gate 46 in a vertical plane, a crank 127 is non-rotatably attached to the projecting end of the shaft 67 by means of a bolt 128 to provide for manual control of the rotation of the shaft. Thus, when pawls 106 and 123 are pivoted out of engagement with the ratchet 91, the latter is released, permitting desired rotation of the shaft 67.

Figure 3 shows in dotted lines the position of the pawls when they are out of operating position. In this relation, it should be noted in Figure 3 that the pawl 106 is pivoted downwardly until the shoulder 109 abuts the transversely extending section 103 of the arm 101 to thereby limit the pivotal movement of the pawl 106. In this retracted position, as shown dotted in Figure 3, the centerline of the spring 118 is at a level below a line extending from the pivot of the pawl 106 to the center hole in the leg 116. Thus, the pull of the spring has a downward component which retains the pawl in the retracted position. Then, when it is desired to have the pawl again engage the ratchet teeth 94, a pull on the rope 98 will pivot the arm 96 to where the center line of the spring 118 passes above the pawl pivot point and thereby causes the pawl to return to operating position.

While a specific embodiment of this invention has been shown and described, the scope of this invention should be limited only by the appended claims.

I claim:

1. A manure spreader comprising in combination a spreader box having an open end therein, a shaft mounted on said box to be rotatable thereon, an adjustable end gate connected to said shaft to depend across the open end, a guide bracket pivotally mounted on said box and defining guide means for the end gate relative to the box, interengaging means mounted on said shaft and end gate for positioning the end gate in response to rotation of the shaft, and shaft rotation actuating means connected with said shaft, whereby the end gate can be adjusted to the desired position.

2. A manure spreader comprising a spreader box having a pair of upwardly directed spaced apart sides, a horizontal floor attached between the sides, and defining an open end therein, the combination of a shaft rotatably supported from said box sides and spaced above said floor across the open end, an adjustable end gate positioned in said open end to close the same, drive means interengaging said shaft and said end gate whereby rotation of the shaft adjusts the position of the end gate, a ratchet wheel non-rotatably mounted on the shaft, an arm pivotally mounted on the shaft to swing about said ratchet wheel, a pawl pivotally mounted on said arm to engage the ratchet wheel on the side of the pawl pivot adjacent the ratchet whereby pivotal movement of said arm rotates said shaft to adjust the end gate, an anchor on said box spaced from said pivotal mounting between the pawl and arm on the side thereof remote from the ratchet, and spring means connected between the pawl on the side of its pivotal mounting on said arm toward its point of contact with said ratchet wheel and the anchor, the anchor being positioned to stretch the spring in a plane between the pivotal mounting on said ratchet wheel whereby said spring will urge said pawl into contact with the ratchet wheel.

3. A manure spreader comprising in combination a pair of spaced apart upstanding box sides, a floor attached horizontally between said sides, said sides and floor forming a spreader box having an open end, a horizontally disposed shaft rotatably mounted on said sides, a gear non-rotatably mounted on said shaft, an adjustable upstanding end gate positioned across said box adjacent said open end, a series of gear teeth vertically disposed on said end gate to mesh with said shaft gear, a guide bracket slidably engaged with said end gate and journaled concentrically with said shaft to maintain said gear and said series of gear teeth in meshed relation, and a rotation imparting mechanism attached to said shaft.

4. A manure spreader comprising in combination a pair of upstanding spaced apart box sides, a floor horizontally attached between said sides, said sides and floor forming a spreader box with an open end therein, a shaft rotatably mounted on said sides to span said box adjacent said open end, an end gate positioned across said box adjacent said open end, a drive mechanism attached between said shaft and said end gate to effect raising and lowering of the latter in response to rotation of said shaft, a guide bracket slidably engaged with said end gate and journaled for rocking movement about said shaft, said gate being free to rock with said guide bracket into a substantially horizontal position when clear of a load in said spreader, and means for imparting rotation to said shaft.

5. A manure spreader comprising in combination a spreader box including a pair of upwardly directed oppositely disposed spaced apart sides with an interconnecting horizontal floor and an open end, a shaft horizontally and rotatably supported from said box sides spaced above said floor and across said open end, an adjustable end gate positioned in said box adjacent said open end side to span the same, means interengaging the shaft and end gate for locating the end gate relative to the box including a gear non-rotatably mounted on said shaft, a series of gear teeth on said end gate positioned to mesh with said shaft gear, a ratchet wheel non-rotatably mounted on said shaft, an arm pivotally mounted to swing about said ratchet wheel on said shaft, a pawl pivotally attached to said arm to engage said ratchet wheel whereby said shaft is rotated upon pivotal movement of said arm to adjust said end gate, a spring connected to said pawl on the side of its pivotal mounting on said arm toward its point of contact with said ratchet wheel, an anchor fixedly supported in relation to said spreader box and spaced from said pivotal mounting on the side thereof remote from said point of contact, and to which anchor said spring is connected, said anchor being positioned to stretch said spring in a plane passing between said pivotal mounting and said ratchet wheel whereby said spring will urge said lever arm in one direction and said pawl into contact wth said ratchet wheel.

6. A manure spreader comprising in combination a pair of vertically positioned spaced apart box sides with a horizontal interconnecting floor and having an open end in a rear end thereof, a shaft rotatably mounted between said sides positioned to span said open end, spaced gears non-rotatably mounted on said shaft, an adjustable end gate vertically positioned in said open end to span the same, a pair of gear racks attached to said end gate to mesh with said shaft gears, guide brackets pivotally mounted on said shaft and engaging the end gate to maintain said gears in meshing relation with said racks whereby rotation of said gears adjusts said end gate, stop means attached to said box immediately rearwardly of said end gate to limit the rearward movement thereof, a lever arm pivotally mounted on said shaft, a ratchet wheel non-rotatably mounted on said shaft adjacent said lever arm, a pawl attached to said lever arm positioned to engage said ratchet wheel upon pivotal movement of said lever arm to thereby rotate said shaft, and a second pawl mounted on said guide bracket to engage said ratchet wheel to maintain said shaft and said end gate in adjusted position.

7. In a manure spreader of the pull type, the combination comprising a spreader box including spaced vertical sides and an interconnecting horizontal floor forming a spreader box for receiving manure and having the rear end thereof open, a conveyor disposed on said box floor transverse to said open end and operable to move manure piled thereupon toward said open end, a shaft rotatably mounted horizontally on said box sides spaced above and spanning said open end, a gear non-rotatably mounted on said shaft, an adjustable end gate vertically positioned in said box open end spanning the same, a gear rack attached to said end gate to mesh with said shaft gear, a guide bracket means pivotally mounted on said shaft and engaging the end gate for maintaining said gear and rack in meshing relation, a shoulder mounted on the side of said box immediately behind said end gate within the lateral extremity of the same and engageable with the latter to maintain it forwardly against the force of the manure on the conveyor, a ratchet wheel non-rotatably mounted on said shaft, teeth on the periphery of said ratchet wheel, a lever arm rotatably mounted on said shaft adjacent said ratchet wheel, a pawl pivotally mounted on said lever arm and positioned to engage said ratchet teeth upon rotation of said lever arm to rotate said shaft and thereby adjust the position of said end gate, a stop pawl mounted on said bracket to engage said ratchet teeth and thereby maintain said end gate in adjusted position, and a rope connected to the end of said lever arm opposite from the shaft end to extend to a remote point whereby pulling on said rope actuates said lever arm to effect said ratchet rotation.

(References on following page)

References Cited in the file of this patent

UNITED STATES PATENTS

| | | |
|---|---|---|
| 287,805 | Cox | Nov. 6, 1883 |
| 552,527 | Harbaugh | Jan. 7, 1896 |
| 652,328 | Parkes | June 26, 1900 |
| 842,238 | Park | Jan. 29, 1907 |
| 867,019 | Dennis et al. | Sept. 24, 1907 |
| 1,341,239 | Mason | May 25, 1920 |
| 1,358,464 | Reiben | Nov. 9, 1920 |
| 1,359,397 | Lerner | Nov. 16, 1920 |
| 2,486,214 | Seaholm | Oct. 25, 1949 |
| 2,541,385 | Rothwell | Feb. 13, 1951 |
| 2,699,949 | Neighbour | Jan. 18, 1955 |
| 2,711,343 | Falk et al. | June 21, 1955 |